United States Patent Office 3,368,459
Patented Feb. 13, 1968

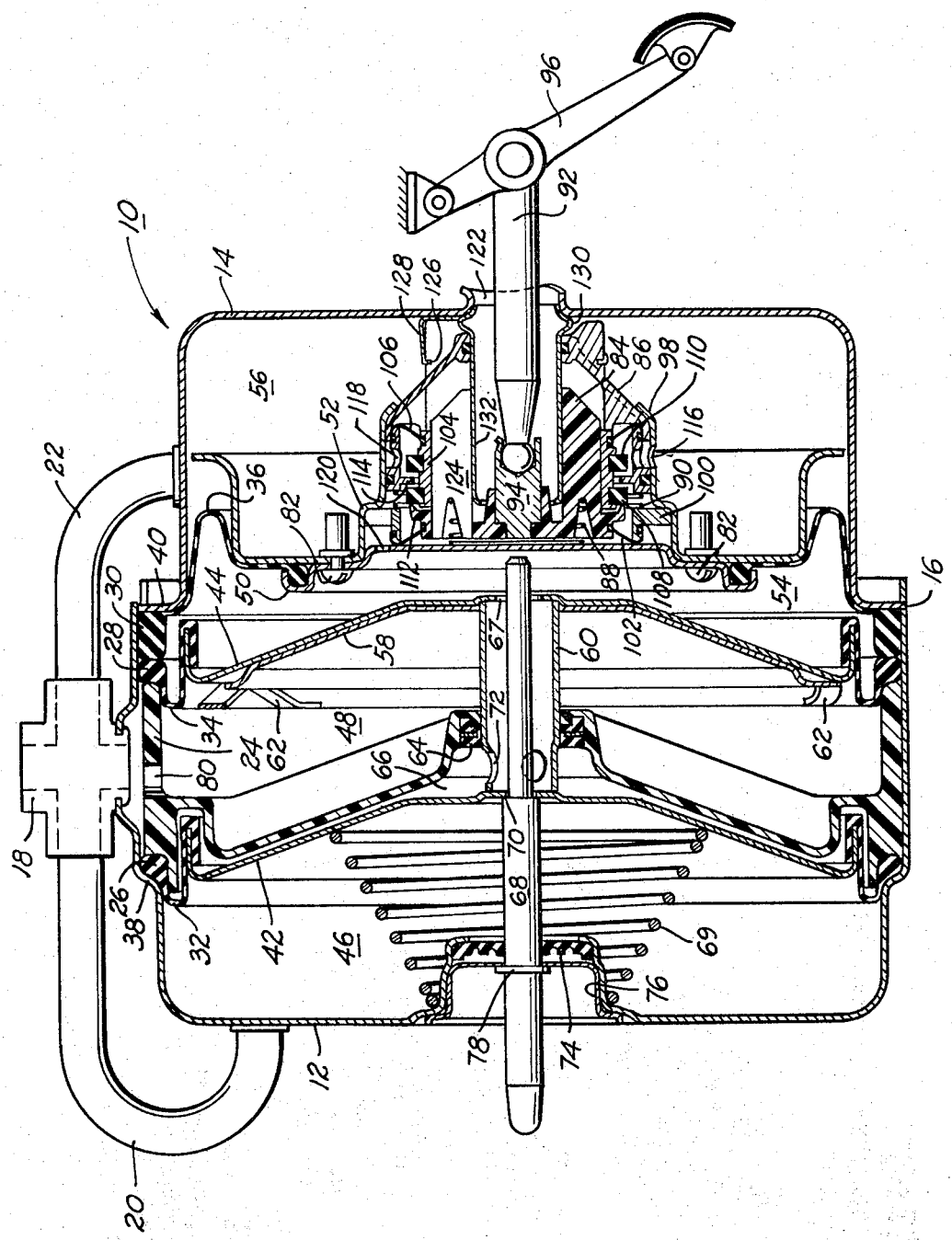

3,368,459
FLUID PRESSURE MOTOR CONSTRUCTION
Charlie N. French, Robert R. Hager, and Thomas M. Julow, South Bend, Ind., assignors to The Bendix Corporation, a corporation of Delaware
Continuation of application Ser. No. 400,503, Sept. 30, 1964. This application Oct. 17, 1966, Ser. No. 587,348
18 Claims. (Cl. 91—391)

ABSTRACT OF THE DISCLOSURE

A fluid pressure servomotor having means operatively connected to a movable wall therewithin to render its power assistance capability progressively weaker after a predetermined stroking of said wall with additional means, if desired, to limit travel of a manual control for the servomotor until power assistance is weakened or eliminated whereupon the limiting means is released to permit the necessary travel of the manual control.

The present invention relates to fluid pressure motors having at least two diaphragms or seals with respect to the servomotor housing; and more particularly to fluid pressure servomotors of the type having a pair of power diaphragms which move together, and a means for indicating the approach of the maximum permissible movement for said power diaphragms. This application is a continuation of our parent application Serial No. 400,503 filed September 30, 1964, now abandoned.

In devices such as power brake servomotors and the like, it has become increasingly desirous to obtain little or no travel for the operation thereof. This has in many instances provided a driver of a vehicle with a false sense of security as to the condition of the vehicle brakes. For example, until the servomotor has reached the stroke runout condition where the movable wall therein has traveled a maximum amount, there would not be any excessive travel sensation imparted to the driver of a need for brake lining adjustments and the like. It is therefore a principal object of this invention to provide a means for indicating the approach of excessive travel within a servomotor of the type mentioned, prior to the actual occurrence of the stroke run-out condition.

It is another object of this invention to provide a new and improved arrangement for sealing a plurality of diaphragms within an internal housing of a fluid pressure motor of an interchangeable nature which are arranged to operate independently of each other.

It is a further object of this invention to provide a unit of the aforesaid type with a balanced valve having a large area to eliminate unnecessary valve forces operative with incremental movements to permit large flow volumes. Smaller valves are known to require ⅜ to ½ inch of travel; whereas with a valve of this type we have reduced this travel to ⁹⁄₁₆ to ¼ inch without adding to the forces needed to operate the valve.

It is a still further object of this invention to provide a releasable holding means for the aforesaid valve means which will permit the translation of the whole valve means upon the release thereof, as during a manual follow-through application under heavy operator loading.

It is also a further object of our invention to provide a spring retention means for the aforesaid valve means to simplify construction techniques.

It is a more specific object of our invention to utilize a series of high-rate springs which are arranged to become operative as one of the walls reaches approximately two-thirds of its maximum travel so that force required to provide further stroke for the wall thereafter will increase by a much greater proportion to provide a heavy feel to the operator of the servomotor, thereby indicating a need for inspection of the system operated thereby.

Other and further objects will appear from the following description of the drawing showing a cross sectional view of a servomotor designed in accordance with the principles of our invention.

With more particular regard to the figure, we show a servomotor 10 formed from the forward and rearward shell 12 and 14, respectively, joined as at 16 by a method more particularly described in U.S. Patent No. 3,146,682 assigned to the common assignee. As seen, the forward shell 12 is provided with a fluid connection 18 that is to be connected with a sub-atmospheric source, such as an engine intake manifold. Furthermore, the shell 12 is also provided with a conduit 20 that connects with the fitting 18 that in turn connects with another conduit 22 to communicate the rear shell 14 with the same sub-atmospheric source. The fitting 18 is designed to be sealingly connected to a stamped opening in the forward shell 12 intermediate its ends, as shown.

Upon joining the shells 12 and 14 and we utilize a plastic spacer body 24 to position sealing beads 26, 28 and 30 of a forward diaphragm 32, an intermediate diaphragm 34 and a rear diaphragm 36, respectively, between a shoulder 38 formed in the forward shell 12 and a radial flange 40 in the rear shell 14.

The forward diaphragm and intermediate diaphragm are also sealingly connected with movable walls 42 and 44 made from the same die to allow universal use prior to assembly. The walls, when assembled in the shells 12 and 14, create a front variable volume chamber 46 and an intermediate variable volume chamber 48. The rear diaphragm 36 is joined with a plate-like structure having a forward section 50 and a rearwardly projecting portion 52 to further divide variable volume chambers 54 and 56 from the remaining portion of the servomotor behind the movable wall 44.

The movable walls are formed such that a forward annular plate 58 and a central tubular projection 60 can be affixed thereto, as on the front face of the movable wall 44 to abut the rear face of the movable wall 42, thereby providing a compression link between the aforesaid movable walls. More particularly, the plate 58 can be set on the tube 60 which is sealingly connected to wall 44 as by resistance welding. This insures the integrity of chambers 54 and 48 and allows plate 58 to move within chamber 48, with or relative to, wall 44. The plate 58 is stamped to form a plurality of leaf springs 62 peripherally so as to cooperate with the inwardly extending portions of the spacer 24 as will be described further hereinafter. It should also be noted at this time, however, that the inwardly directed portion of the spacer terminates in a seal 64 which cooperates with the tubular projection 60 to separate the variable volume chamber 48 from a still further variable volume chamber 66 which is communicated internally of tube 60 to the variable volume chamber 54. Wall 44 can be drilled as at 67, or preformed with a larger hole to provide an adequate flow passage. As seen, the variable volume chamber 66 is communicated internally of the tubular projection 60 by means of the space 67 between the movable wall 44 and a force transmitting rod 68 maintained by the bearing and seal contact of the spacer 24 and projection 60. A shoulder 70 of rod 68 is resistance welded to the forward movable wall 42 to provide force transmission contact therewith; and the tubular projection 60 is punched or drilled at spaced intervals to provide radial openings 72 to permit the aforesaid flow communication. As with other units of the same general type as we have herein shown, we provide a seal 74 adjacent the opening in the forward shell 12 surrounding the force transmitting rod 68. However, we have modified this opening somewhat by inserting therein a hat-shaped member 76 which cooperates with a C-washer 78 fitted in a groove in member 68 to provide a rear stop for the force transmitting member. This does away with the need of an adjustable push rod or force transmitting rod 68 in that a spring 69 will maintain the rearward position of the push rod constant from unit to unit regardless of the positions of the internal structure.

As seen, the spacer 24 is provided with a radially disposed opening 80 to permit communication of fluid pressure from the fitting 18 to within the chamber 48.

As for the rear diaphragm 36 and the two portion movable walls to which it is attached inwardly of the rear shell 14, we have shown a means of biasing a valve assembly between the forward portion 50 and the rearward projection 52 before assembling of these projections as by bolts 82. More particularly, we have shown a valve carrying body 84 and a concentric surrounding valve seat member 86 which are biased by means of springs 88 and 90, respectively, towards the rear of the shell 14. The poppet body 84 is shown in its rearward position abutting a plurality of ribs formed on member 86 through valve seat 104 and annular seat 112. The body 84 is connected with a link 92 as by the member 94 which is in turn connected with a pedal operating member 96. The seat carrying member 86 is constructed to radially abut upon a downward turned flange 98 of the rear portion 52 due to the biasing action of the spring 90 between the member 86 and a spacer member 100 that abuts the forward portion 50.

As seen, the central body 84 is connected to the spacer 100 by means of an annular diaphragm 102 and the valve seat carrying member is connected to the valve seat 104 by means of another diaphragm 106 at the opposite end of the central core 84. In the position shown, the valve poppet carrying member bearing a pair of resilient rings 108 and 110 is positioned in its forwardmost attitude on the central body 84 to abut the annular seat 112 formed on the central body and to be spaced from a depending seat 114 of the seat carrying member 86. In such a position, the pressure in the tube 22 enters through an opening 116 in the rearward projection 52 to a radical opening drilled in the seat carrying structure 86, as at 118, at spaced intervals therearound to pass about the poppet rings 108 and 110 into the chamber 54 as by an opening 120 in the forward portion 50. Pressure differing from that in tube 22 and chamber 56 is introduced to the opposite sides of diaphragms 102 and 106 through a central opening 122 and a passage 124 formed in the member 84 so that the seal rings 108 and 110 will be positioned as shown. In the event the pedal 96 is moved inwardly toward the servomotor 10, the seat 112 will be displaced from the ring 108 and the ring 110 will be caused to bear upon the depending seat 114 to thereby supply the chamber 54 with a pressure differing from that in the tube 22, which pressure through the tubular projection 60 will also be provided to the variable volume chamber 66 to create pressure differentials across the walls 42 and 44 and the associated diaphragms 32 and 34 to cause a displacement of the force transmitting or push rod 68 to the left as viewed in the figure. At the same time, a pressure differential is created across diaphragm 36 to create a reaction force opposing pedal force to allow a light finger spring 128 to hold the valve structure so long as pedal force and reaction force are substantially equal.

If the travel of the movable walls 42 and 44 is approaching an excessive amount, the springs 62 will start to bear upon the inwardly projecting portions of the spacer 24 to bring about a spring resistance to further travel. This is designed in the particular unit shown to occur at about two-thirds of the maximum travel allowed for wall 42 so that at the two-thirds position, the springs will be generating 0 lb. of force, but, if the stroke is continued to approximately the three-quarters position or maximum travel for wall 44, the springs will be exerting a 300-lb. force to the shell which would decrease the force available in rod 68 so that pedal force must be increased to provide more differential to make up for this loss.

In addition, the valve seat carrying member 86 is provided with a radially inwardly directed groove 126 for affixing the annular spring finger mechanism 128 to member 86. The spring has depending portions arranged so that when a great or excessive force is applied to the pedal 96, the portions will rise over a cam 130 on a guide tube 132 to release the valve structure and permit follow-up manually to displace the push rod 68. At this time, pedal force goes through member 94 to wall portion 50 and thus to rod 68, bypassing the valve poppet rings and the appropriate seat means to prevent scarring the rings.

It will be apparent that the objects heretofore enumerated, as well as others, have been accomplished and that there has been provided a new and improved servomotor.

While the invention has been described in considerable detail, we do not wish to be limited to the particular embodiments shown and described; and it is our intention to cover hereby all novel adaptations, modifications and arrangements thereof which come within the practice of those skilled in the art to which the invention relates.

We claim:

1. A fluid pressure servomotor comprising:
 a housing;
 a first movable wall in said housing;
 a second movable wall in said housing;
 an output means operatively connected to said first and second movable walls;
 a control mechanism operatively connected to said first and second movable walls for creating a similar pressure differential across the same, which control mechanism is responsive to reactive forces from the operation of said servomotor; and
 means affixed to one of said first movable wall or said second movable wall and normally inoperative until said one of said first and second movable walls has stroked a predetermined amount to engage said means with a portion of said housing to increase the reaction forces on said control means in accordance with the travel of said one of said first and second movable walls in said housing.

2. A structure of claim 1 wherein said means is further characterized as a resilient means affixed to one of said first and second movable walls, which resilient means is adapted to transfer the power available from said wall to said housing in increasing increments after said one of said first and second movable walls has stroked a predetermined amount within said housing.

3. The structure of claim 2 wherein said servomotor further comprises a spacer means affixed to said housing between said movable walls, said spacer having a bearing surface for cooperation with said resilient means to incrementally transfer the power available from said one of said first and second movable walls, as said wall approaches said spacer.

4. The structure of claim 2 wherein said resilient means is a leaf spring on said one of said first and second movable walls.

5. A fluid pressure servomotor comprising:
 a movable wall means within a housing of the servomotor;
 control means adapted to create a pressure differential for operating said movable wall means, which control means has a link operatively connected to said movable wall means and to a manual control; and
 resilient means affixed to said movable wall means and normally spaced from an end wall of said housing and engageable therewith to be thereby operative to indicate the approach of stroke run-out condition of said movable wall means as it approaches said end wall of said housing by increasing reaction forces on said link and said manual control in accordance with the stroke of said movable wall means above a predetermined travel.

6. A fluid pressure servomotor according to claim 5 wherein said control means comprises a balanced valve means controlling the operation of the movable wall means within the servomotor, which balanced valve means is provided with releasable holding means operatively connecting said valve means to the servomotor and arranged to release said valve means to allow follow-up movement of the valve means without damage of said valve means during the application of excessive pressure to translate said movable wall means.

7. A fluid pressure servomotor according to claim 5 and further comprising a force transmitting rod operatively connected to said movable wall means and to a return spring operatively connected between the servomotor and the movable wall means so as to maintain the movable wall means to the rear of the servomotor in the released attitude, said rod having a return stop means operatively connected to the servomotor to limit its inward position in said servomotor.

8. A fluid pressure servomotor according to claim 7 wherein said movable wall means includes first and second movable walls and said rod forms an inner support and guide for said second movable wall and a spacer means that is arranged between the first and second movable walls and is provided with an annular opening to which sealing means is operatively connected to support and guide said first movable wall within said servomotor.

9. A fluid pressure servomotor comprising:
a housing including two shell portions sealingly joined with a spacer body dividing a chamber internally thereof into two portions;
a first movable wall operatively arranged in said housing behind said spacer in one portion of said chamber;
a second movable wall operatively arranged in said housing ahead of said spacer in the other portion of said chamber;
a force transmitting means which is operatively connected to said first and second movable walls and relatively movable with respect to at least one of said first and second movable walls;
a control mechanism operatively associated with said servomotor within said housing to control said first and second movable walls, which control mechanism is operatively associated with said force transmitting means to manually actuate same in the absence of actuation thereof by said first or second movable walls;
means to position said force transmitting means in a released position, which means is operatively connected to said first and second movable walls; and
a member operatively connected to one of said first and second movable walls, which member is normally inoperative until one of said first and second movable walls is stroked a predetermined distance within said housing and thereafter operative to reduce the effectiveness of said one of said first and second movable walls whereby reaction forces will be rapidly increased on said control mechanism to indicate an abnormal condition occurring in said servomotors such as excessive travel of said first and/or second movable walls.

10. A fluid pressure servomotor according to claim 9 wherein said control mechanism includes a valve means and releasable holding means for said valve means arranged to release said valve means upon manual actuation of said force transmitting means.

11. A fluid pressure servomotor according to claim 10 wherein said valve means is characterized as balanced valve means.

12. A fluid pressure servomotor according to claim 11 wherein said spring is located on said first movable wall to be normally spaced from said spacer and to contact said spacer upon an excessive stroking of said first movable wall to reduce the effectiveness of said first movable wall on said force transmitting means whereby reactive force on said control mechanism will be rapidly increased thereafter.

13. A fluid pressure servomotor according to claim 9 wherein said control mechanism is mounted to said housing by a third movable wall located behind said first movable wall such that control pressure scheduled by said valve means to stroke said first and second movable wall also reacts to hold valve travel to a minimum.

14. A fluid pressure servomotor according to claim 9 wherein said member is further characterized as a spring affixed to one of said first and second movable walls, which spring is adapted to transfer the power available from said wall to which it is affixed to said housing in increasing increments after said one of said first and second movable walls has stroked a predetermined amount within said housing.

15. A fluid pressure servomotor according to claim 14 wherein said valve means is further characterized as balanced valve means.

16. A fluid pressure servomotor comprising:
a first movable wall;
a second movable wall connected to said first movable wall;
a spacer means rigidly affixed between said movable walls; and
valve means controlling the operation of said movable walls within the servomotor, which valve means is provided with operator-operated means and with a releasable holding means operatively connecting said valve means to the servomotor, said holding means being operatively connected to said operator-operated means to allow follow-up movement of the valve means without damage of said valve means during the application of excessive pressure to said operator-operated means to translate said first and second movable walls.

17. A fluid pressure servomotor comprising:
a first movable wall;
a second movable wall operatively connected to said first movable wall;
a spacer means rigidly affixed to said servomotor between said first and second movable walls;
a force transmitting means slidably carried by said spacer means and operatively connected to said first movable wall and said second movable wall for actuation thereby;
a valve means for controlling the translation of said first and second movable walls which valve means is provided with an operator-operated means and with a releasable holding means arranged to release said valve means in accordance with the force applied to said operator-operated means to allow said valve means to manually actuate said force transmitting means; and
pressure responsive means to mount said valve means within the servomotor.

18. A fluid pressure servomotor comprising:
a first movable wall;
a second movable wall operatively connected to said first movable wall;
a spacer means rigidly affixed in said servomotor between said first and second movable walls; and
a balanced valve means controlling the operation of the movable wall within the servomotor, which balanced valve means is provided with an operator-operated means and a releasable holding means operatively connecting said valve means to the servomotor said holding means being operatively connected to said operator-operated means to allow follow-up movement of the valve means without damage of said valve means during the application of excessive pressure to said operator-operated means to translate said first and second movable walls, said valve means being resiliently biased to oppose forces on said operator-operated means within the servomotor.

References Cited

UNITED STATES PATENTS

| | | | |
|---|---|---|---|
| 2,280,341 | 4/1942 | Mott | 92—85 |
| 2,393,524 | 1/1946 | Fant | 91—434 |
| 2,467,517 | 4/1949 | Almond | 92—48 |
| 3,013,537 | 12/1961 | Schultz | 91—376 |
| 3,032,806 | 5/1962 | Mallory | 92—23 |
| 3,067,727 | 12/1962 | Ayers et al. | 91—391 |
| 3,075,499 | 1/1963 | Prather | 91—434 |
| 3,155,012 | 11/1964 | Ayers | 92—49 |
| 3,173,659 | 3/1965 | Hemmeter | 92—23 |

MARTIN P. SCHWADRON, *Primary Examiner.*

PAUL E. MASLOUSKY, *Examiner.*